(12) United States Patent
Park et al.

(10) Patent No.: US 11,005,680 B2
(45) Date of Patent: May 11, 2021

(54) REPROGRAMMING APPARATUS FOR VEHICLE, REPROGRAMMING METHOD THEREOF, AND VEHICLE INCLUDING THE SAME

(71) Applicants: HYUNDAI MOTOR COMPANY, Seoul (KR); KIA MOTORS CORPORATION, Seoul (KR)

(72) Inventors: Pil Yong Park, Seoul (KR); Ho Jin Jung, Bucheon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 22 days.

(21) Appl. No.: 16/660,518

(22) Filed: Oct. 22, 2019

(65) Prior Publication Data
US 2020/0358635 A1 Nov. 12, 2020

(30) Foreign Application Priority Data
May 8, 2019 (KR) .......................... 10-2019-0053410

(51) Int. Cl.
*G06F 15/16* (2006.01)
*H04L 12/40* (2006.01)
(52) U.S. Cl.
CPC ..... *H04L 12/4013* (2013.01); *H04L 2012/40215* (2013.01); *H04L 2012/40273* (2013.01)

(58) Field of Classification Search
CPC ....... H04L 12/4013; H04L 2012/40273; H04L 2012/40215; H04L 12/4625; H04L 12/40
See application file for complete search history.

(56) References Cited

U.S. PATENT DOCUMENTS

| | | | | |
|---|---|---|---|---|
| 10,542,033 B2 * | 1/2020 | Otsuka | ................ | H04L 63/1408 |
| 10,606,796 B2 * | 3/2020 | Hirata | ..................... | H04L 67/12 |
| 2015/0010017 A1 * | 1/2015 | Kraly | ................ | H04L 12/40032 370/468 |
| 2015/0373158 A1 * | 12/2015 | Kim | .................. | H04L 12/40189 709/223 |

(Continued)

*Primary Examiner* — Hieu T Hoang
(74) *Attorney, Agent, or Firm* — Brinks Gilson & Lione

(57) ABSTRACT

A reprogramming apparatus for vehicle, a reprogramming method and a vehicle including the same are provided. The reprogramming apparatus for the vehicle may include: a diagnostic unit configured to diagnose a plurality of controllers of the vehicle; a reprogramming unit configured to reprogram the plurality of controllers; and a gateway configured to control communication connection among the diagnostic unit, the reprogramming unit, and the plurality of controllers, wherein the gateway is configured to change a Controller Area Network (CAN) communication mode to a Controller Area Network with Flexible Data-rate (CAN-FD) communication mode when a communication mode change request is received from the reprogramming unit, check whether CAN-FD communication mode cancellation conditions are satisfied when the CAN communication mode has been changed to the CAN-FD communication mode, and change the CAN-FD communication mode to the CAN communication mode when the CAN-FD communication mode cancellation conditions are satisfied.

20 Claims, 7 Drawing Sheets

(56) References Cited

U.S. PATENT DOCUMENTS

| | | | |
|---|---|---|---|
| 2016/0094312 A1* | 3/2016 | Fredriksson | H04L 1/0061 |
| | | | 714/807 |
| 2016/0112215 A1* | 4/2016 | Lee | H04L 12/403 |
| | | | 370/235 |
| 2016/0286010 A1* | 9/2016 | Lennartsson | H04L 69/10 |
| 2017/0092018 A1* | 3/2017 | Throop | G07C 5/008 |
| 2018/0152364 A1* | 5/2018 | Lee | H04L 12/40143 |
| 2018/0281598 A1* | 10/2018 | Shu | G05B 19/042 |
| 2019/0079842 A1* | 3/2019 | Chae | G05B 23/02 |
| 2019/0268444 A1* | 8/2019 | Mardmoeller | H04L 45/741 |
| 2019/0340844 A1* | 11/2019 | Tonshal | G07C 5/008 |

* cited by examiner

FIG. 3

- Request message

| Data Byte | Parameter Name | Hex Value | Embodiment |
|---|---|---|---|
| #1d | ReadDataByIdentifier Request SID | #22h | - |
| #2d | dataIdentifier [] #1 = [<br>    byte #1 (MSB) | #XXh | F100h |
| #3d |     byte #2 ] | #XXh | |

- Response message

| Data Byte | Parameter Name | Hex Value | Embodiment |
|---|---|---|---|
| #1d | ReadDataByIdentifier Request SID | #62h | - |
| #2d | dataIdentifier [] #1 = [<br>    byte #1 (MSB) | #XXh | F100h |
| #3d |     byte #2 ] | #XXh | |
| #4d | ParameterIdentifier [] #1 = [<br>    byte ] | #XXh | 00h : HS-CAN Only<br>01h : CAN-FD Only<br>02h : HS-CAN and CAN-FD |

FIG. 4

| Data Byte | Parameter Name | Hex Value | Embodiment |
|---|---|---|---|
| #1d | RoutineControl request Service ID | #31h | - |
| #2d | Sub-function = [ routineControlType] | #XXh | 01h : startRoutine<br>02h : stopRoutine<br>03h : requestRoutineResults |
| #3d<br>#4d | routineIdentifier [] = [<br>        byte #1 (MSB)<br>        byte #2 ] | #XXh<br>#XXh | F000h : G/W D-CAN HS-CAN Mode<br>F001h : G/W D-CAN CAN-FD Mode |

REPROGRAMMING APPARATUS FOR VEHICLE, REPROGRAMMING METHOD THEREOF, AND VEHICLE INCLUDING THE SAME

CROSS-REFERENCE TO RELATED APPLICATION

The present application claims priority to and the benefit of Korean Patent Application No. 10-2019-0053410, filed on May 8, 2019, which is hereby incorporated by reference in its entirety.

TECHNICAL FIELD

The present disclosure relates to a reprogramming apparatus for a vehicle and, more specifically, to a reprogramming apparatus for a vehicle which can efficiently perform CAN with flexible data-rate (CAN-FD) reprogramming using an on-board diagnostics (OBD) connector, a reprogramming method thereof, and a vehicle including the same.

BACKGROUND

The statements in this section merely provide background information related to the present disclosure and may not constitute prior art.

In general, vehicle controller area network (CAN) communication loads increase as vetronics are accelerated. To solve such issues, CAN with flexible data-rate (CAN-FD) communication has emerged.

CAN-FD communication has a higher data rate than CAN communication and can use a payload of up to 64 bytes.

Reprogramming for updating a controller of a vehicle can make the best use of such advantages of CAN-FD communication.

CAN-FD reprogramming can improve development efficiency and reduce maintenance time by rapidly performing controller update.

However, on-board diagnostics (OBD) regulations provide that a user must not use a CAN-FD function while a CAN network is operated because CAN-FD tolerance cannot be guaranteed.

Accordingly, diagnostic CAN communication is configured to support high-speed (HS) CAN communication because all controllers of a vehicle do not support CAN-FD communication.

For this reason, to satisfy requirements of OBD regulations, a CAN-FD programming module cannot be connected to diagnostic CAN communication to be used.

Since the CAN-FD reprogramming module cannot perform CAN-FD reprogramming through an OBD CAN channel as described above, a reprogramming speed for vehicle controller update decreases and maintenance time increases.

Accordingly, it may be necessary to develop a reprogramming apparatus for a vehicle which can perform CAN-FD reprogramming through an OBD CAN channel while satisfying OBD regulations.

SUMMARY

The present disclosure provides a reprogramming apparatus for a vehicle which can reduce a reprogramming time and improve reprogramming efficiency by changing a CAN communication mode to a CAN-FD communication mode through a gateway supporting both HS-CAN communication and CAN-FD communication and performing reprogramming, a reprogramming method thereof, and a vehicle including the same.

It will be appreciated by persons skilled in the art that the objects that could be achieved with the present disclosure are not limited to what has been particularly described hereinabove and the above and other objects that the present disclosure could achieve will be more clearly understood from the following detailed description.

A reprogramming apparatus for a vehicle in one form of the present disclosure includes: a diagnostic unit configured to diagnose controllers of the vehicle; a reprogramming unit configured to reprogram controllers of the vehicle; and a gateway configured to control communication connection between one of the diagnostic unit and the reprogramming unit and the controllers of the vehicle, wherein the gateway changes a CAN communication mode to a CAN-FD communication mode when a communication mode change request is received from the reprogramming unit, checks whether CAN-FD communication mode cancellation conditions are satisfied when the CAN communication mode has been changed to the CAN-FD communication mode, and changes the CAN-FD communication mode to the CAN communication mode when the CAN-FD communication mode cancellation conditions are satisfied.

Further, a reprogramming method of a reprogramming apparatus for a vehicle including a gateway configured to control communication connection between one of a diagnostic unit and a reprogramming unit and controllers of the vehicle, in one form of the present disclosure, includes: the gateway checking whether a communication mode change request is received from the reprogramming unit; the gateway changing a CAN communication mode to a CAN-FD communication mode when the communication mode change request is received from the reprogramming unit; the reprogramming unit performing CAN-FD reprogramming on the controllers of the vehicle; the gateway checking whether CAN-FD communication mode cancellation conditions are satisfied; the gateway changing the CAN-FD communication mode to the CAN communication mode when the CAN-FD communication mode cancellation conditions are satisfied; and the reprogramming unit suspending CAN-FD reprogramming on the controllers of the vehicle.

Further, a computer-readable recording medium recording a program for executing a reprogramming method of a reprogramming apparatus for a vehicle, in one form of the present disclosure, may store a program for executing processes in the reprogramming method of a reprogramming apparatus for a vehicle.

Further, a vehicle in one form of the present disclosure includes: a plurality of controllers connected through communication; and a reprogramming apparatus for reprogramming the controllers, wherein the reprogramming apparatus comprises: a diagnostic unit configured to diagnose the controllers; a reprogramming unit configured to reprogram the controllers; and a gateway configured to change a CAN communication mode to a CAN-FD communication mode when a communication mode change request is received from the reprogramming unit, to check whether CAN-FD communication mode cancellation conditions are satisfied when the CAN communication mode has been changed to the CAN-FD communication mode, and to change the CAN-FD communication mode to the CAN communication mode when the CAN-FD communication mode cancellation conditions are satisfied.

It will be appreciated by persons skilled in the art that the effects that can be achieved with some forms of the present disclosure are not limited to what has been particularly described hereinabove and other advantages of the present disclosure will be more clearly understood from the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is tables showing examples of a request message and a response message for checking whether a target controller supports CAN-FD reprogramming.

FIG. 4 is a table showing an example of a request message for communication mode change.

Figure 1:
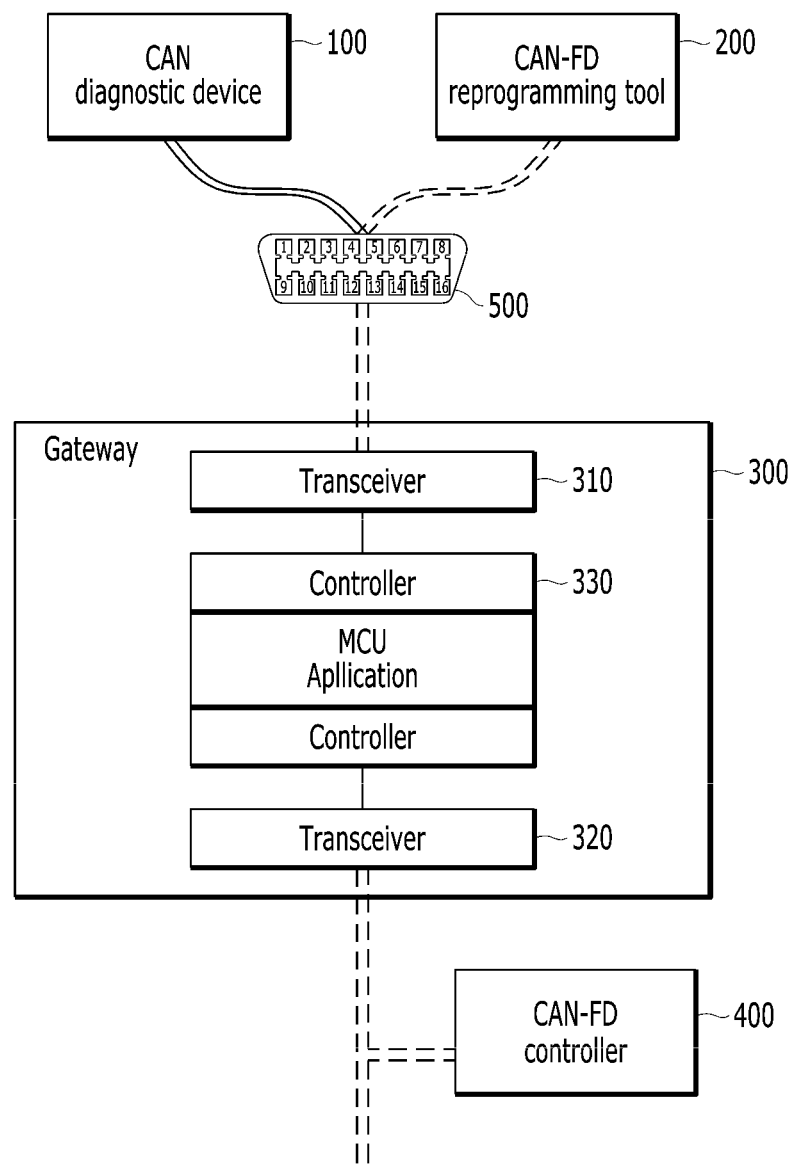
FIG. 1 is a block diagram for describing a reprogramming apparatus for a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination thereof Throughout the specification, when it is said that some part "includes" a specific element, this means that the part may further include other elements, not excluding them, unless otherwise mentioned. The same reference numbers will be used throughout this specification to refer to the same or like parts.

Hereinafter, a reprogramming apparatus for a vehicle, a reprogramming method thereof, and a vehicle including the same which can be applied to some forms of the present disclosure will be described in detail with reference to FIGS. 1 to 7.

FIG. 1 is a block diagram for describing a reprogramming apparatus for a vehicle in some forms of the present disclosure.

As shown in FIG. 1, the reprogramming apparatus for a vehicle may include a diagnostic unit 100 for diagnosing controllers 400 of the vehicle, a reprogramming unit 200 for reprogramming the controllers 400 of the vehicle, and a gateway 300 for controlling communication connection between one of the diagnostic unit 100 and the reprogramming unit 200 and the controllers 400 of the vehicle.

Here, the diagnostic unit 100 is a client and can use high-speed CAN (HS-CAN) communication to satisfy OBD regulations.

In addition, the reprogramming unit 200 is a client and can use CAN-FD communication.

Further, the reprogramming unit 200 can check whether a target controller to be reprogrammed among the controllers 400 of the vehicle can support CAN-FD communication before requesting communication mode change to the gateway 300.

When the reprogramming unit 200 checks whether the target controller can support CAN-FD communication, the reprogramming unit 200 can request that the gateway 300 change communication modes if the target controller can support CAN-FD communication.

Further, the reprogramming unit 200 can perform reprogramming of the target controller among the controllers 400 of the vehicle through CAN-FD communication when the gateway 300 has changed a CAN communication mode to a CAN-FD communication mode.

Next, the gateway 300 can deliver messages between clients including the diagnostic unit 100 and the reprogramming unit 200 and a server including the controllers 400 of the vehicle and route different types of protocol messages.

For example, the gateway 300 may include a first transceiver 310 connected to the diagnostic unit 100 or the reprogramming unit 200 through communication, a second transceiver 320 connected to the controllers 400 of the vehicle through communication, and a controller 300 connected to the first and second transceivers 310 and 320 to control communication mode change.

Here, the first transceiver 310 may be connected to the diagnostic unit 100 or the reprogramming unit 200 through communication using an OBD connector 500.

In this case, a communication line between the first transceiver 310 and the OBD connector 500 can support both CAN communication and CAN-FD communication such that a CAN message and a CAN-FD message are transmitted.

In addition, communication lines between the second transceiver 320 and the controllers 400 can support both CAN communication and CAN-FD communication such that a CAN message and a CAN-FD message are transmitted.

In this manner, CAN-FD and CAN messages can be transmitted and received through a diagnostic CAN communication line.

Accordingly, the diagnostic CAN communication line can be set to the HS-CAN communication mode when a diagnostic message of the diagnostic unit 100 is transmitted and received and set to the CAN-FD communication mode when a diagnostic message of the reprogramming unit 200 is transmitted and received.

Further, the first and second transceivers 310 and 320 of the gateway 300 can convert a digital signal into a physical signal.

Further, the controller 330 of the gateway 300 can statically set transmission speed time quantum by setting prescalar and bit segment.

In addition, the gateway 300 may be set to the CAN communication mode by default, and a communication mode set value may be changed by client commands of the diagnostic unit 100 and the reprogramming unit 200.

That is, the gateway 300 can change the CAN communication mode to the CAN-FD communication mode upon reception of a communication mode change request from the reprogramming unit 200, check whether CAN-FD communication mode cancellation conditions are satisfied when the CAN communication mode has been changed to the CAN-FD communication mode, and change the CAN-FD communication mode to the CAN communication mode if the CAN-FD communication mode cancellation conditions are satisfied.

Here, the CAN communication mode may be the HS-CAN communication mode but is not limited thereto.

When the gateway 300 checks whether the CAN-FD communication mode cancellation conditions are satisfied, the CAN-FD communication mode cancellation conditions are satisfied if a diagnosis request message is not received from the diagnostic unit 100 or the reprogramming unit 200 for a predetermined time.

For example, the predetermined time may be about 4000 ms to 6000 ms but is not limited thereto.

When the gateway 300 checks whether the CAN-FD communication mode cancellation conditions are satisfied, the gateway 300 can determine that the CAN-FD communication mode cancellation conditions are satisfied when the engine has switched from ON to OFF in some cases.

In another case, when the gateway 300 checks whether the CAN-FD communication mode cancellation conditions are satisfied, the gateway 300 can determine that the CAN-FD communication mode cancellation conditions are satisfied when an electronic control unit (ECU) is reset.

In another case, when the gateway 300 checks whether the CAN-FD communication mode cancellation conditions are satisfied, the gateway 300 can determine that the CAN-FD communication mode cancellation conditions are satisfied when a CAN communication mode change request is received.

When the gateway 300 checks whether the CAN-FD communication mode cancellation conditions are satisfied, the gateway 300 can maintain the CAN-FD communication mode if the CAN-FD communication mode cancellation conditions are not satisfied.

In addition, the reprogramming unit 200 can perform reprogramming of the target controller among the controllers 400 of the vehicle through CAN-FD communication when the gateway 300 has changed the CAN communication mode to the CAN-FD communication mode, and the diagnostic unit 100 can perform diagnosis on the target controller among the controllers 400 of the vehicle when the gateway 300 has changed the CAN communication mode to the CAN-FD communication mode.

In this manner, the diagnostic CAN communication line in some forms of the present disclosure can support both HS-CAN communication and CAN-FD communication and thus can be connected to both the diagnosis unit 100 and the reprogramming unit 200.

In addition, a communication mode set value can be changed by client commands of the diagnostic unit 100 and the reprogramming unit 200 in the gateway 300 if the controller 330 that is a diagnostic CAN controller is set to the HS-CAN communication mode by default.

Further, the controller 330 of the gateway 300 can be switched to the HS-CAN communication mode that is a default mode when the CAN-FD communication mode cancellation conditions are satisfied.

Accordingly, some forms of the present disclosure can reduce a reprogramming time and improve efficiency by changing the CAN communication mode to the CAN-FD communication mode through the gateway that supports both HS-CAN communication and CAN-FD communication.

In addition, some forms of the present disclosure can perform CAN-FD reprogramming through the OBD CAN channel while satisfying the OBD regulations. Accordingly, some forms of the present disclosure have advantages in terms of cost and weight and do not increase material costs because it can be realized according to software change without hardware change.

Furthermore, some forms of the present disclosure can perform CAN-FD reprogramming and thus increase vehicle model development efficiency and decrease a time required for controller reprogramming in service providers and manufacturers.

Figure 2:
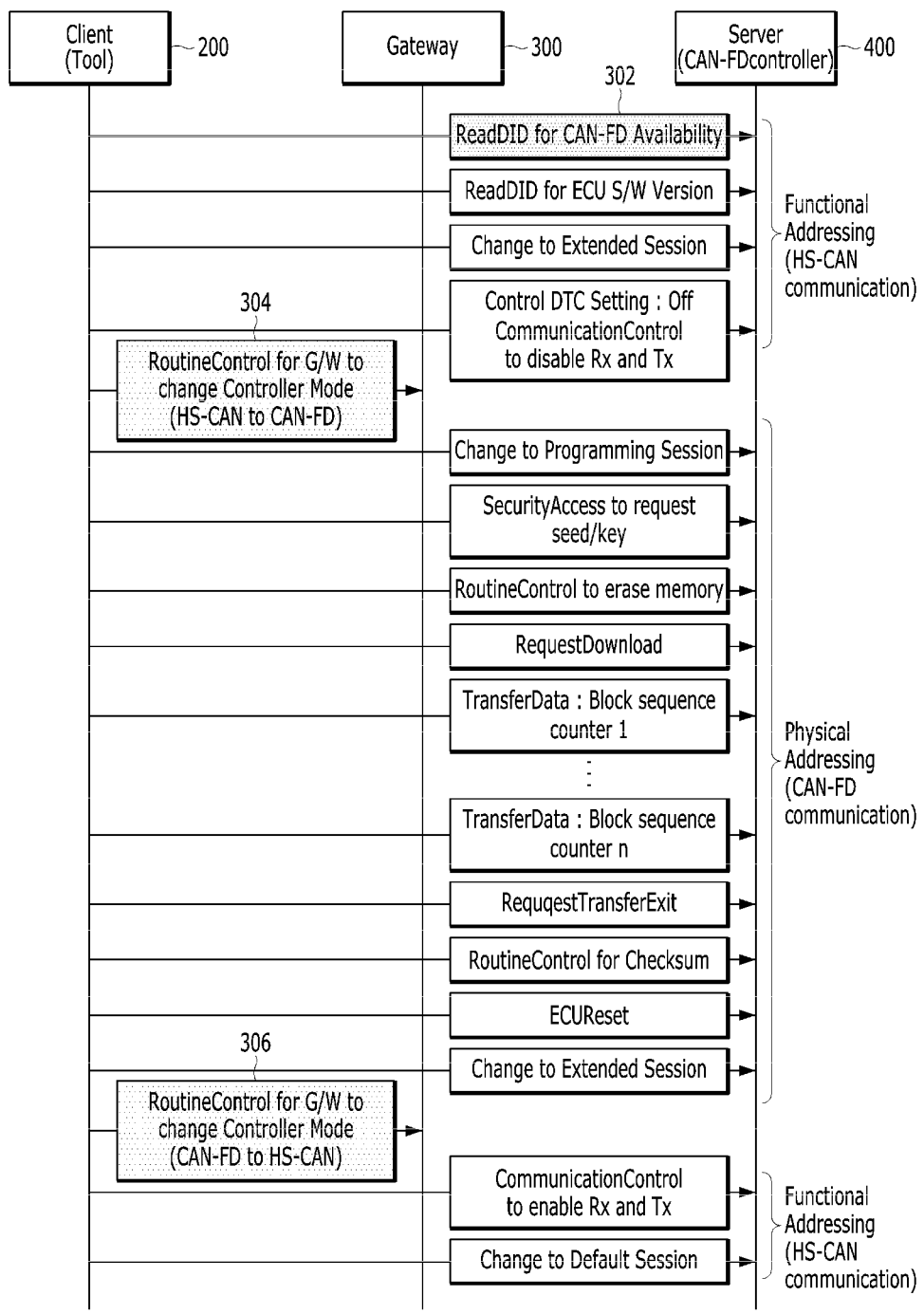
FIG. 2 is a flowchart for describing a reprogramming process of the reprogramming apparatus for a vehicle in one form of the present disclosure.

FIG. 2 is a flowchart for describing a reprogramming process of the reprogramming apparatus for a vehicle in some forms of the present disclosure, FIG. 3 is tables showing examples of a request message and a response message for checking whether a target controller supports CAN-FD reprogramming and FIG. 4 is a table showing an example of a request message for communication mode change.

As shown in FIG. 2, the reprogramming apparatus for a vehicle can include the reprogramming unit 200 for reprogramming controllers 400 of the vehicle and the gateway 300 for controlling communication connection between the reprogramming unit 200 and the controllers 400 of the vehicle.

Here, the reprogramming unit 200 is a client and can use CAN-FD communication.

The gateway 300 can deliver messages between a client including the reprogramming unit 200 and a server including the controllers 400 of the vehicle and route different types of protocol messages.

First, the reprogramming unit 200 may transmit a request message in order to check whether a target controller to be reprogrammed among the controllers 400 of the vehicle can support CAN-FD communication before requesting communication mode change of the gateway 300 (302).

Here, the request message may be a message of a new sequence for checking whether CAN-FD reprogramming is supported for the target controller, as shown in FIG. 3.

Next, the target controller may transmit a response message indicating whether CAN-FD communication is supported.

Subsequently, the reprogramming unit 200 may request that the gateway 300 change communication modes upon determining that CAN-FD communication can be supported through the response message of the target controller (304).

That is, the reprogramming unit 200 can transmit a diagnostic CAN mode change request message to the gateway 300 as shown in FIG. 4.

Although the gateway 300 is set to the HS-CAN communication mode by default, a communication mode set value may be changed from the HS-CAN communication mode to the CAN-FD communication mode according to a client command of the reprogramming unit 200.

Thereafter, the reprogramming unit 200 can perform reprogramming of the target controller among the controllers 400 of the vehicle through CAN-FD communication when the gateway 300 has switched from the HS-CAN communication mode to the CAN-FD communication mode.

Upon completion of CAN-FD reprogramming of the target controller, the reprogramming unit 200 may request that the gateway 300 change communication modes again (306).

Then, the gateway 300 may change the communication mode set value from the CAN-FD communication mode to the HS-CAN communication mode according to a client command of the reprogramming unit 200.

That is, the reprogramming unit 200 can perform physical addressing of the controllers 400 through CAN-FD communication when the gateway 300 has switched from the HS-CAN communication mode to the CAN-FD communication mode and perform functional addressing of the controllers 400 through HS-CAN communication when the gateway 300 has switched from the CAN-FD communication mode to the HS-CAN communication mode.

Here, the gateway 300 can change communication modes according to a command of a client such as the reprogramming unit 200 but may change communication modes according to other conditions.

This will be described in more detail below.

Figure 5:
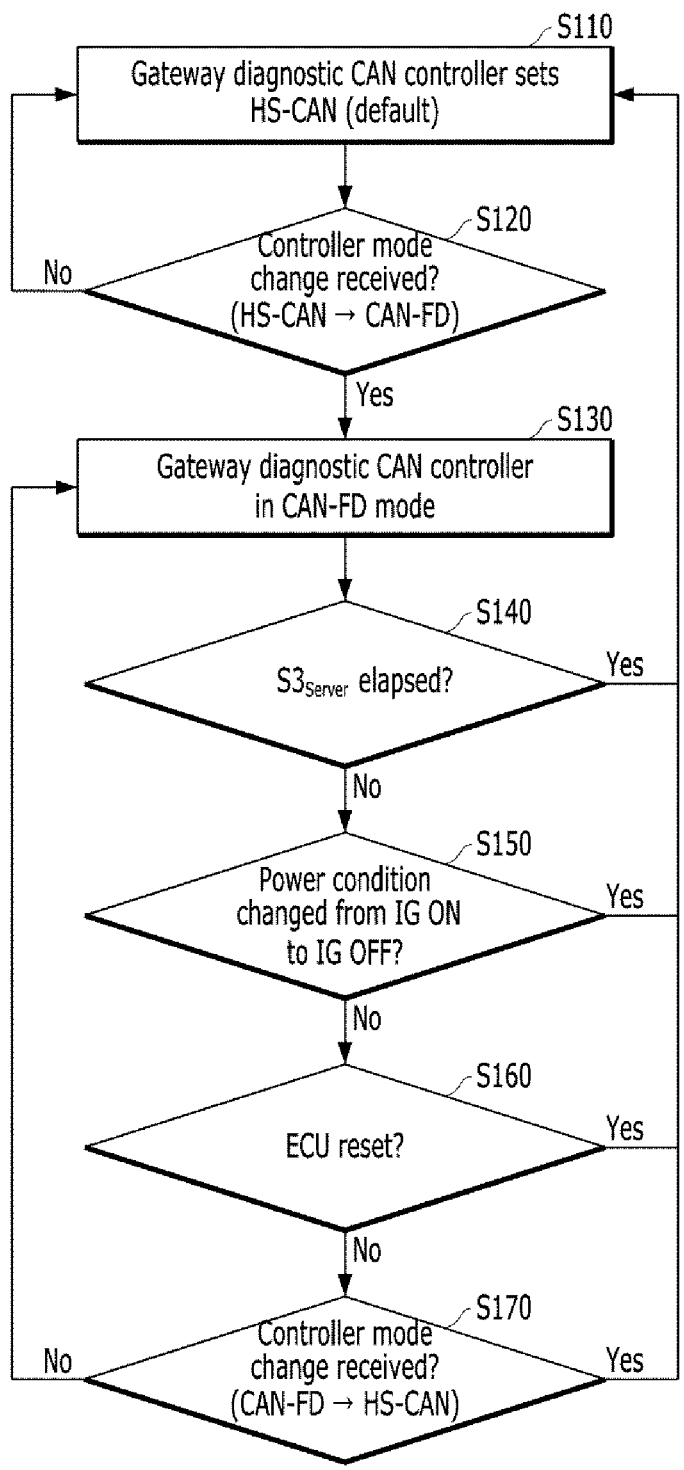
FIG. 5 is a flowchart for describing a communication mode change process of a gateway.

FIG. 5 is a flowchart for describing a communication mode change process of the gateway.

As shown in FIG. 5, a gateway diagnostic CAN controller may set the HS-CAN communication mode as a default mode (S110).

In addition, the gateway diagnostic CAN controller may check whether a communication mode change request is received (S120).

Here, the communication mode change request may be a request for change from the HS-CAN communication mode that is the default mode to the CAN-FD communication mode.

Then, the gateway diagnostic CAN controller can change the HS-CAN communication mode to the CAN-FD communication mode when the communication mode change request is received (S130).

Subsequently, the gateway diagnostic CAN controller can check whether the CAN-FD communication mode cancellation conditions are satisfied when the HS-CAN communication mode has changed to the CAN-FD communication mode (S140 to S170).

First, the gateway diagnostic CAN controller can determine whether a predetermined time in which a diagnosis request message can be received from a client has elapsed when the HS-CAN communication mode has changed to the CAN-FD communication mode (S140).

For example, the predetermined time may be about 4000 ms to 6000 ms but is not limited thereto.

If the gateway diagnostic CAN controller determines that the predetermined time has elapsed, the CAN-FD communication mode can be reset to the default HS-CAN communication mode.

If the gateway diagnostic CAN controller determines that the predetermined time has not elapsed, the gateway diagnostic CAN controller can check whether the engine has switched from ON to OFF as a power condition (S150).

If the gateway diagnostic CAN controller determines that the engine has switched from ON to OFF, the CAN-FD communication mode can be reset to the default HS-CAN communication mode.

If the gateway diagnostic CAN controller determines that the engine has not switched from ON to OFF, the gateway diagnostic CAN controller can check whether the ECU has been reset (S160).

If the gateway diagnostic CAN controller determines that the ECU has been reset, the CAN-FD communication mode can be reset to the default HS-CAN communication mode.

If the gateway diagnostic CAN controller determines that the ECU has not been reset, the gateway diagnostic CAN controller can check whether a communication mode change request has been received (S170).

If the gateway diagnostic CAN controller determines that a communication mode change request has been received, the CAN-FD communication mode can be reset to the default HS-CAN communication mode.

However, if the gateway diagnostic CAN controller determines that a communication mode change request has not been received, the CAN-FD communication mode can be maintained.

In this manner, the gateway diagnostic CAN controller can set the HS-CAN communication mode as a default mode and change the mode to the CAN-FD communication mode according to a request message of a client for communication mode change.

In addition, the gateway diagnostic CAN controller can change the CAN-FD communication mode to the HS-CAN communication mode that is the default mode when specific conditions are satisfied for a fail-operation.

Here, the first specific condition is that a time $S3_{Server}$ has elapsed.

The time $S3_{Server}$ can be defined as follows.

TABLE 1

| Timing parameter | Details | Type | Form |
|---|---|---|---|
| $S3_{Client}$ | Maximum time when a client allows multiple servers to maintain a diagnostic session instead of a default session through functionally addressed TestPresent (3E hex) message transmission or requests a single server through physical communication | Timer reload value | 2000 ms |
| $S3_{Server}$ | Time in which a server can maintain a diagnostic session. If a diagnosis request message is not received for this time, transition to a default session may occur. | Timer reload value | 5000 |

In addition, the second specific condition is switching from engine on (IG ON) to engine off (IG OFF), the third specific condition is occurrence of reset of the ECU, and the fourth specific condition is communication mode change request according to RoutineControl.

Figure 6:
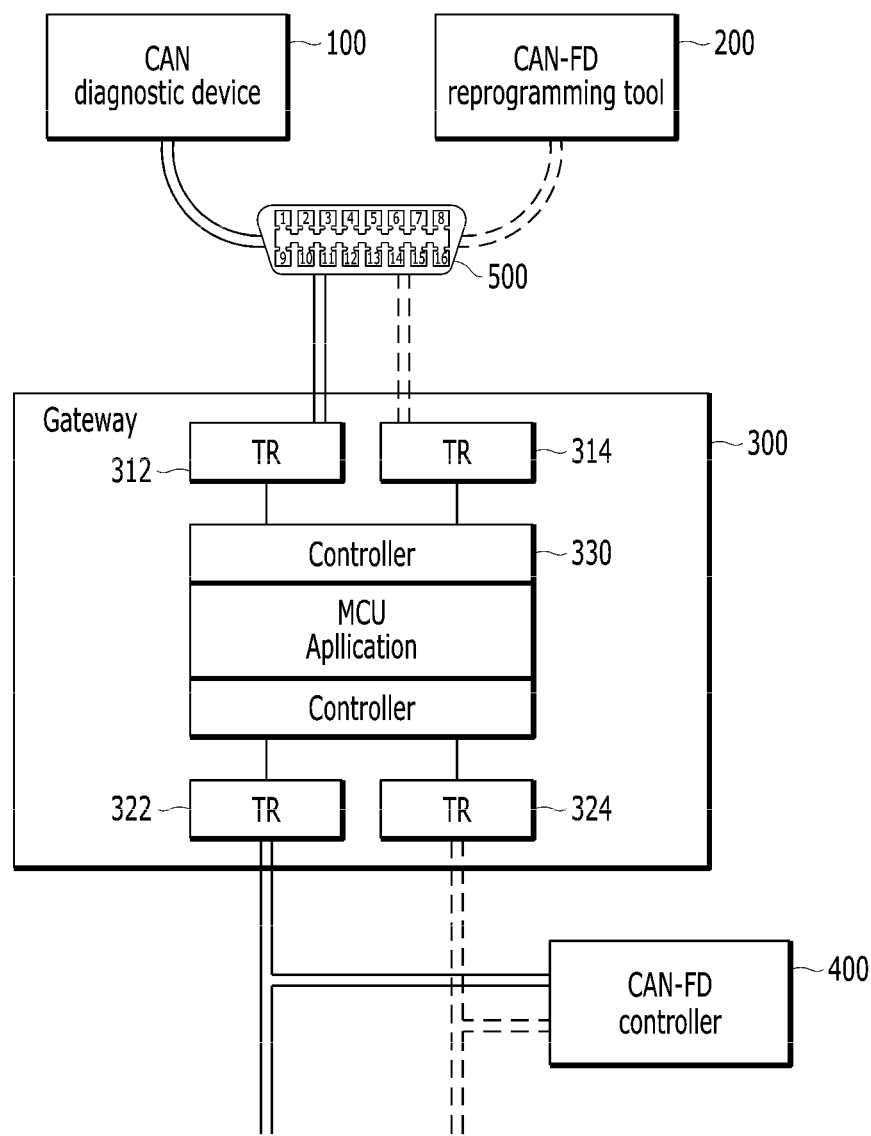
FIG. 6 is a block diagram for describing a reprogramming apparatus for a vehicle in one form of the present disclosure.

FIG. 6 is a block diagram for describing a reprogramming apparatus for a vehicle in some forms of the present disclosure.

As shown in FIG. 6, the reprogramming apparatus for a vehicle may include the diagnostic unit 100 for diagnosing controllers 400 of the vehicle, the reprogramming unit 200 for reprogramming the controllers 400 of the vehicle, and the gateway 300 for controlling communication connection between one of the diagnostic unit 100 and the reprogramming unit 200 and the controllers 400 of the vehicle.

Here, the diagnostic unit 100 is a client and can use high-speed CAN (HS-CAN) communication to satisfy OBD regulations.

In addition, the reprogramming unit 200 is a client and can use CAN-FD communication.

The gateway 300 can deliver messages between clients including the diagnostic unit 100 and the reprogramming unit 200 and a server including the controllers 400 of the vehicle and route different types of protocol messages.

For example, the gateway 300 may include a first transceiver 312 connected to the diagnostic unit 100 through communication, a second transceiver 314 connected to the reprogramming unit 200 through communication, a third transceiver 322 connected to the controllers 400 of the vehicle through communication to transmit a diagnostic message of the diagnostic unit 100, a fourth transceiver 324 connected to the controllers 400 of the vehicle through communication to transmit a diagnostic message of the reprogramming unit 200, and a controller 300 connected to the first to fourth transceivers 312, 314, 322 and 324 to control communication mode change.

Here, the first transceiver 312 may be connected to the diagnostic unit 100 through communication using an OBD connector 500, and the second transceiver 314 may be connected to the reprogramming unit 200 through communication using the OBD connector 500

In addition, a first communication line between the first transceiver 312 and the OBD connector 500 can support CAN communication such that a CAN message can transmitted and a second communication line between the second transceiver 314 and the OBD connector 500 can support CAN-FD communication such that a CAN-FD message can be transmitted.

Further, a third communication line between the third transceiver 322 and the controllers 400 can support CAN communication such that a CAN message can transmitted and a fourth communication line between the fourth transceiver 324 and the controllers 400 can support CAN-FD communication such that a CAN-FD message can be transmitted.

In this manner, the gateway 300 may be set to the CAN communication mode by default, and a communication mode set value may be changed by client commands of the diagnostic unit 100 and the reprogramming unit 200.

That is, the gateway 300 can change the CAN communication mode to the CAN-FD communication mode upon reception of a communication mode change request from the reprogramming unit 200, check whether CAN-FD communication mode cancellation conditions are satisfied when the CAN communication mode has been changed to the CAN-FD communication mode, and change the CAN-FD communication mode to the CAN communication mode if the CAN-FD communication mode cancellation conditions are satisfied.

Here, the CAN communication mode may be the HS-CAN communication mode but is not limited thereto.

When the gateway 300 checks whether the CAN-FD communication mode cancellation conditions are satisfied, the CAN-FD communication mode cancellation conditions are satisfied if a diagnosis request message is not received from the diagnostic unit 100 or the reprogramming unit 200 for a predetermined time.

For example, the predetermined time may be about 4000 ms to 6000 ms but is not limited thereto.

When the gateway 300 checks whether the CAN-FD communication mode cancellation conditions are satisfied, the gateway 300 can determine that the CAN-FD communication mode cancellation conditions are satisfied when the engine has switched from ON to OFF in some cases.

In another case, when the gateway 300 checks whether the CAN-FD communication mode cancellation conditions are satisfied, the gateway 300 can determine that the CAN-FD communication mode cancellation conditions are satisfied when an electronic control unit (ECU) is reset.

In another case, when the gateway 300 checks whether the CAN-FD communication mode cancellation conditions are satisfied, the gateway 300 can determine that the CAN-FD communication mode cancellation conditions are satisfied when a CAN communication mode change request is received.

When the gateway 300 checks whether the CAN-FD communication mode cancellation conditions are satisfied, the gateway 300 can maintain the CAN-FD communication mode if the CAN-FD communication mode cancellation conditions are not satisfied.

In addition, the reprogramming unit 200 can perform reprogramming of the target controller among the controllers 400 of the vehicle through CAN-FD communication when the gateway 300 has changed the CAN communication mode to the CAN-FD communication mode, and the diagnostic unit 100 can perform diagnosis on the target controller among the controllers 400 of the vehicle when the gateway 300 has changed the CAN communication mode to the CAN-FD communication mode.

In this manner, some forms of the present disclosure can reduce a reprogramming time and improve efficiency by designing the reprogramming apparatus such that a double communication path including a CAN communication path and a CAN-FD communication path is provided for each controller 400.

Figure 7:
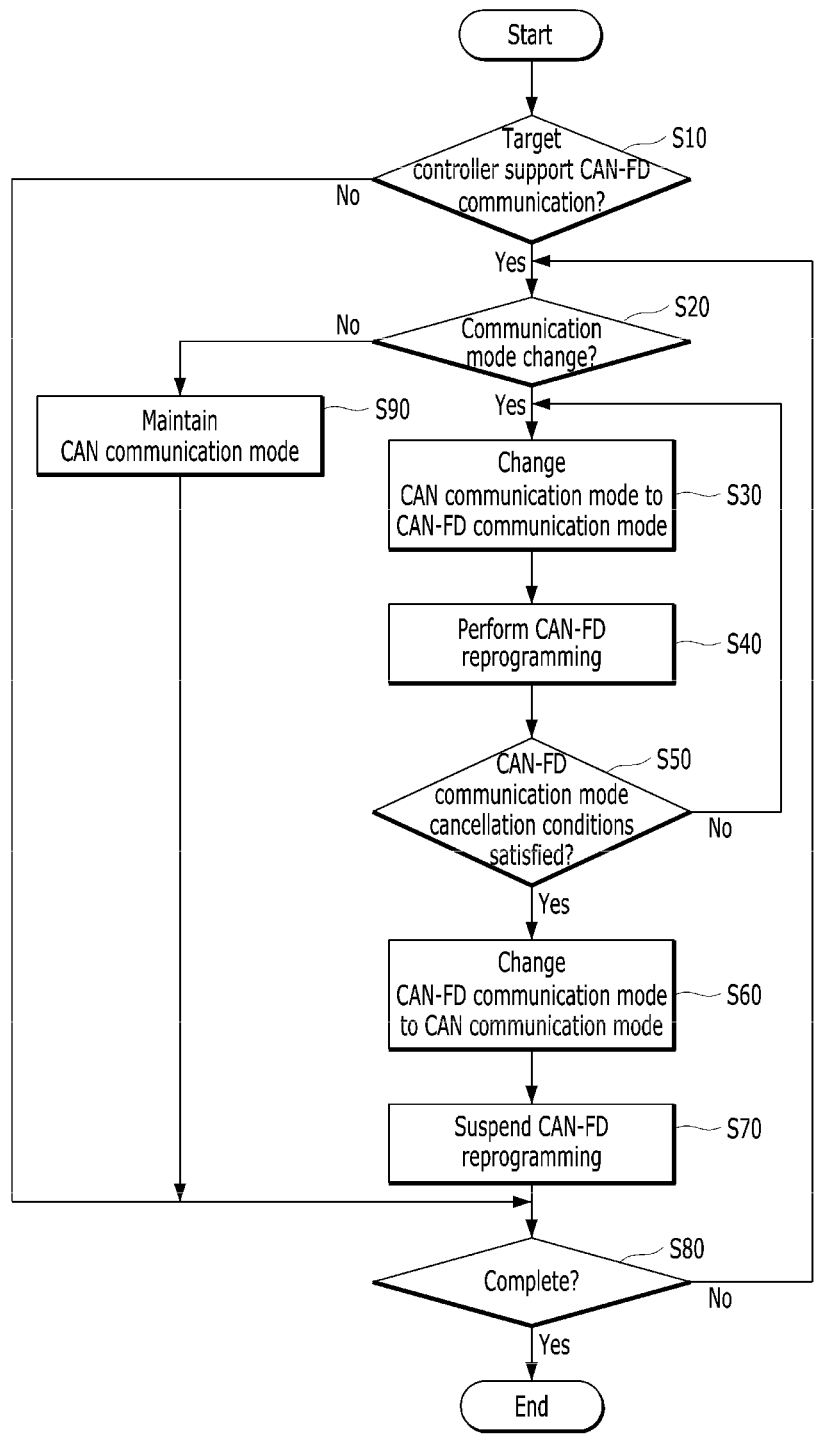
FIG. 7 is a flowchart for describing a reprogramming process of a reprogramming apparatus for a vehicle in one form of the present disclosure.

FIG. 7 is a flowchart for describing a reprogramming process of a reprogramming apparatus for a vehicle in some forms of the present disclosure.

As shown in FIG. 7, the reprogramming unit may check whether a target controller to be reprogrammed among controllers of the vehicle can support CAN-FD communication (S10).

Then, the reprogramming unit may transmit a communication mode change request to the gateway if the target controller can support CAN-FD communication.

Thereafter, the gateway may check whether the communication mode change request is received from the reprogramming unit (S20).

Subsequently, the gateway may change the CAN communication mode to the CAN-FD communication mode if the communication mode change request is received from the reprogramming unit (S30).

However, if the communication mode change request is not received from the reprogramming unit, the gateway may maintain the CAN communication mode as the default mode (S90).

The reprogramming unit may perform CAN-FD reprogramming on the controllers of the vehicle (S40).

Here, the reprogramming unit can reprogram the target controller among the controllers of the vehicle through CAN-FD communication.

Then, the gateway may check whether the CAN-FD communication mode cancellation conditions are satisfied (S50).

For example, when the gateway checks whether the CAN-FD communication mode cancellation conditions are satisfied, the gateway may determine that the CAN-FD communication mode cancellation conditions are satisfied if a diagnosis request message is not received from the diagnostic unit or the reprogramming unit for a predetermined time.

Here, the predetermined time may be about 4000 ms to 6000 ms but is not limited thereto.

When the gateway checks whether the CAN-FD communication mode cancellation conditions are satisfied, the gateway may determine that the CAN-FD communication mode cancellation conditions are satisfied when the engine has switched from ON to OFF in some cases.

In another case, when the gateway checks whether the CAN-FD communication mode cancellation conditions are satisfied, the gateway may determine that the CAN-FD communication mode cancellation conditions are satisfied when an electronic control unit (ECU) is reset.

In another case, when the gateway checks whether the CAN-FD communication mode cancellation conditions are satisfied, the gateway may determine that the CAN-FD communication mode cancellation conditions are satisfied when a CAN communication mode change request is received.

Thereafter, the gateway may change the CAN-FD communication mode to the CAN communication mode if the CAN-FD communication mode cancellation conditions are satisfied (S60).

However, the gateway may maintain the CAN-FD communication mode if the CAN-FD communication mode cancellation conditions are not satisfied.

The reprogramming unit may suspend CAN-FD reprogramming of the controllers of the vehicle (S70).

The diagnostic unit may perform diagnosis on the target controller among the controllers of the vehicle when the gateway has changed the CAN-FD communication mode to the CAN communication mode.

Subsequently, the gateway may check whether reprogramming is completed (S80) and end the process when reprogramming is completed.

In this manner, some forms of the present disclosure can reduce a reprogramming time and improve efficiency by changing the CAN communication mode to the CAN-FD communication mode through the gateway that supports both HS-CAN communication and CAN-FD communication.

In addition, some forms of the present disclosure can perform CAN-FD reprogramming through the OBD CAN channel while satisfying the OBD regulations. Accordingly, some forms of the present disclosure have the advantages in terms of cost and weight and do not increase material costs because it can be realized according software change without hardware change.

Furthermore, some forms of the present disclosure can perform CAN-FD reprogramming and thus increase vehicle model development efficiency and decrease a time required for controller reprogramming in service providers and manufacturers.

Moreover, some forms the present disclosure provide a computer-readable recording medium recording a program for executing the reprogramming method of a reprogramming apparatus for a vehicle to perform the processed in the reprogramming method of a reprogramming apparatus for a vehicle.

Further, a vehicle in some forms of the present disclosure may include a plurality of controllers connected through communication and a reprogramming apparatus for reprogramming the controllers, wherein the reprogramming apparatus includes: a diagnostic unit configured to diagnose the controllers; a reprogramming unit configured to reprogram the controllers; and a gateway configured to change a CAN communication mode to a CAN-FD communication mode when a communication mode change request is received from the reprogramming unit, to check whether CAN-FD communication mode cancellation conditions are satisfied when the CAN communication mode has been changed to the CAN-FD communication mode, and to change the CAN-FD communication mode to the CAN communication mode if the CAN-FD communication mode cancellation conditions are satisfied.

The above-described forms of the present disclosure may be implemented as computer-readable code in a computer-readable recording medium having a program recorded thereon. The computer-readable recording medium includes all kinds of recording devices in which data readable by a computer system is stored. Example of the computer-readable medium include a hard disk drive (HDD), a solid state disk (SDD), a silicon disk drive (SDD), a ROM, a RAM, a CD-ROM, a magnetic tape, a floppy disk, an optical data storage device, etc.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A reprogramming apparatus for a vehicle, comprising:
   a diagnostic unit configured to diagnose a plurality of controllers of the vehicle;
   a reprogramming unit configured to reprogram the plurality of controllers; and
   a gateway configured to control communication connection among the diagnostic unit, the reprogramming unit, and the plurality of controllers,
   wherein the gateway is configured to:
   change a Controller Area Network (CAN) communication mode to a Controller Area Network with Flexible Data-rate (CAN-FD) communication mode when a communication mode change request is received from the reprogramming unit;
   check whether CAN-FD communication mode cancellation conditions are satisfied when the CAN communication mode has been changed to the CAN-FD communication mode; and
   change the CAN-FD communication mode to the CAN communication mode when the CAN-FD communication mode cancellation conditions are satisfied.

2. The reprogramming apparatus of claim 1, wherein the reprogramming unit is configured to:
   check whether a target controller of the plurality of controllers to be reprogrammed is able to support CAN-FD communication before transmitting the communication mode change request to the gateway.

3. The reprogramming apparatus of claim 1, wherein the gateway is configured to set to the CAN communication mode by default.

4. The reprogramming apparatus of claim 1, wherein, when the gateway checks whether the CAN-FD communication mode cancellation conditions are satisfied, the gateway is configured to:
   determine that the CAN-FD communication mode cancellation conditions are satisfied when a diagnosis request message is not received from the reprogramming unit for a predetermined amount of time.

5. The reprogramming apparatus of claim 1, wherein, when the gateway checks whether the CAN-FD communication mode cancellation conditions are satisfied, the gateway is configured to:
   determine that the CAN-FD communication mode cancellation conditions are satisfied when an engine has switched from ON to OFF.

6. The reprogramming apparatus of claim 1, wherein, when the gateway checks whether the CAN-FD communication mode cancellation conditions are satisfied, the gateway is configured to:
  determine that the CAN-FD communication mode cancellation conditions are satisfied when an electronic control unit (ECU) is reset.

7. The reprogramming apparatus of claim 1, wherein, when the gateway checks whether the CAN-FD communication mode cancellation conditions are satisfied, the gateway is configured to:
  determine that the CAN-FD communication mode cancellation conditions are satisfied when a CAN communication mode change request is received.

8. The reprogramming apparatus of claim 1, wherein, when the gateway checks whether the CAN-FD communication mode cancellation conditions are satisfied, the gateway is configured to maintain the CAN-FD communication mode when the CAN-FD communication mode cancellation conditions are not satisfied.

9. The reprogramming apparatus of claim 1, wherein the gateway further comprises:
  a first transceiver connected to the diagnostic unit or the reprogramming unit through a communication;
  a second transceiver connected to the plurality of controllers through the communication; and
  a controller of the plurality of controllers connected to the first transceiver and the second transceiver to control communication mode change.

10. The reprogramming apparatus of claim 9, wherein the first transceiver is connected to the diagnostic unit or the reprogramming unit through the communication using an on-board diagnostics (OBD) connector.

11. The reprogramming apparatus of claim 1, wherein the gateway further comprises:
  a first transceiver connected to the diagnostic unit through a communication;
  a second transceiver connected to the reprogramming unit through the communication;
  a third transceiver connected to the plurality of controllers through the communication to transmit a diagnostic message of the diagnostic unit;
  a fourth transceiver connected to the plurality of controllers through the communication to transmit a diagnostic message of the reprogramming unit; and
  a controller of the plurality of controllers connected to the first transceiver, the second transceiver, the third transceiver, and the fourth transceiver to control communication mode change.

12. The reprogramming apparatus of claim 11, wherein:
  the first transceiver is connected to the diagnostic unit through communication using an OBD connector, and
  the second transceiver is connected to the reprogramming unit through communication using the OBD connector.

13. A reprogramming method of a reprogramming apparatus for a vehicle, the reprogramming method comprising:
  checking, by a gateway, whether a communication mode change request is received from a reprogramming unit, wherein the gateway is configured to control communication connection among a diagnostic unit, the reprogramming unit, and a plurality of controllers;
  changing, by the gateway, a Controller Area Network (CAN) communication mode to a Controller Area Network with Flexible Data-rate (CAN-FD) communication mode when the communication mode change request is received from the reprogramming unit;
  performing, by the reprogramming unit, CAN-FD reprogramming on the plurality of controllers;
  checking, by the gateway, whether CAN-FD communication mode cancellation conditions are satisfied;
  changing, by the gateway, the CAN-FD communication mode to the CAN communication mode when the CAN-FD communication mode cancellation conditions are satisfied; and
  suspending, by the reprogramming unit, CAN-FD reprogramming on the plurality of controllers.

14. The reprogramming method of claim 13, wherein the method further comprises:
  checking, by the reprogramming unit, whether a target controller of the plurality of controllers to be reprogrammed is able to support CAN-FD communication before checking whether the communication mode change request is received from the reprogramming unit.

15. The reprogramming method of claim 13, wherein checking whether the CAN-FD communication mode cancellation conditions are satisfied comprises:
  determining that the CAN-FD communication mode cancellation conditions are satisfied when a diagnosis request message is not received from the diagnostic unit or the reprogramming unit for a predetermined amount of time.

16. The reprogramming method of claim 13, wherein checking whether the CAN-FD communication mode cancellation conditions are satisfied comprises:
  determining that the CAN-FD communication mode cancellation conditions are satisfied when an engine has switched from ON to OFF.

17. The reprogramming method of claim 13, wherein checking whether the CAN-FD communication mode cancellation conditions are satisfied comprises:
  determining that the CAN-FD communication mode cancellation conditions are satisfied when an electronic control unit (ECU) is reset.

18. The reprogramming method of claim 13, wherein checking whether the CAN-FD communication mode cancellation conditions are satisfied comprises:
  determining that the CAN-FD communication mode cancellation conditions are satisfied when a CAN communication mode change request is received.

19. A non-transitory computer-readable recording medium having a program recorded thereon, the program to direct a processor to perform acts of:
  checking whether a communication mode change request is received from a reprogramming unit, wherein the gateway is configured to control communication connection among a diagnostic unit, the reprogramming unit, and a plurality of controllers;
  changing a Controller Area Network (CAN) communication mode to a Controller Area Network with Flexible Data-rate (CAN-FD) communication mode when the communication mode change request is received from the reprogramming unit;
  performing CAN-FD reprogramming on the plurality of controllers;
  checking whether CAN-FD communication mode cancellation conditions are satisfied;
  changing the CAN-FD communication mode to the CAN communication mode when the CAN-FD communication mode cancellation conditions are satisfied; and
  suspending CAN-FD reprogramming on the plurality of controllers.

20. A vehicle comprising:
- a plurality of controllers connected through communication; and
- a reprogramming apparatus configured to reprogram the plurality of controllers,
- wherein the reprogramming apparatus further comprises:
- a diagnostic unit configured to diagnose the plurality of controllers;
- a reprogramming unit configured to reprogram the plurality of controllers; and
- a gateway configured to:
- change a Controller Area Network (CAN) communication mode to a Controller Area Network with Flexible Data-rate (CAN-FD) communication mode when a communication mode change request is received from the reprogramming unit;
- check whether CAN-FD communication mode cancellation conditions are satisfied when the CAN communication mode has been changed to the CAN-FD communication mode; and
- change the CAN-FD communication mode to the CAN communication mode when the CAN-FD communication mode cancellation conditions are satisfied.

* * * * *